US007652822B2

(12) United States Patent
Gardner et al.

(10) Patent No.: US 7,652,822 B2
(45) Date of Patent: *Jan. 26, 2010

(54) METHODS AND APPARATUS FOR PROCESSING A LARGE AREA PULSED LASER BEAM TO CREATE APERTURES THROUGH MICROLENS ARRAYS

(75) Inventors: Richard N. Gardner, Raleigh, NC (US); Thomas A. Rinehart, Durham, NC (US); Robert L. Wood, Apex, NC (US)

(73) Assignee: Bright View Technologies, Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/120,834

(22) Filed: May 15, 2008

(65) Prior Publication Data
US 2008/0259461 A1    Oct. 23, 2008

Related U.S. Application Data

(63) Continuation of application No. 11/382,163, filed on May 8, 2006, now Pat. No. 7,394,594.

(51) Int. Cl.
G02B 27/10 (2006.01)
(52) U.S. Cl. ..................................................... 359/619
(58) Field of Classification Search .......... 359/619–626
See application file for complete search history.

(56) References Cited

U.S. PATENT DOCUMENTS 4,172,219 A   10/1979   Deml et al.

4,666,248 A   5/1987   van de Ven
4,914,270 A   4/1990   Copley et al.
5,666,176 A   9/1997   Kurematsu
6,178,045 B1  1/2001   Cook et al.
6,788,460 B2  9/2004   Knox et al.

(Continued)

FOREIGN PATENT DOCUMENTS

EP    1 174 208 A2    1/2002

(Continued)

OTHER PUBLICATIONS

U.S. Appl. No. 11/364,423, filed Feb. 28, 2006, Wood.

(Continued)

Primary Examiner—Alicia M Harrington
(74) Attorney, Agent, or Firm—Myers Bigel Sibley & Sajovec, P.A.

(57) ABSTRACT

A pulsed laser beam is used to create apertures in a layer on a back side of a substrate that includes a microlens array on a front side thereof. The pulsed laser beam is focused in a vacuum spatial filter. A profile of the pulsed laser beam that emerges from the vacuum spatial filter is converted to a top hat profile. The laser beam having the top hat profile is diffused. Finally, the pulsed laser beam having the top half profile that has been diffused is impinged through the microlens array on the front side of the substrate and onto the layer on the back side of the substrate. Related apparatus for creating the apertures and microlens array products are also described.

18 Claims, 12 Drawing Sheets

U.S. PATENT DOCUMENTS

| | | |
|---|---|---|
| 6,816,306 B2 | 11/2004 | Freese et al. |
| 6,829,087 B2 | 12/2004 | Freese et al. |
| 6,967,779 B2 | 11/2005 | Fadel et al. |
| 2003/0206342 A1 | 11/2003 | Reed et al. |
| 2003/0210462 A1 | 11/2003 | Freese et al. |
| 2004/0130790 A1 | 7/2004 | Sales |
| 2005/0058947 A1 | 3/2005 | Rinehart et al. |
| 2005/0058948 A1 | 3/2005 | Freese et al. |
| 2005/0058949 A1 | 3/2005 | Wood et al. |
| 2006/0054606 A1 | 3/2006 | Amako |
| 2006/0061869 A1 | 3/2006 | Fadel et al. |
| 2006/0087742 A1 | 4/2006 | Shimizu |
| 2006/0139758 A1 | 6/2006 | Segawa et al. |

FOREIGN PATENT DOCUMENTS

| | | |
|---|---|---|
| EP | 1 489 438 A1 | 12/2004 |
| JP | 10-123523 A | 5/1998 |
| JP | 11-101902 A | 4/1999 |
| WO | WO 95/09068 A1 | 4/1995 |

OTHER PUBLICATIONS

U.S. Appl. No. 11/179,162, filed Jul. 12, 2005, Wood.

U.S. Appl. No. 11/113,846, filed Apr. 25, 2005, Wood.

Coyne et al. "Characterisation of laser ablation of silicon using a Gaussian wavefront and computer generated wavefront reconstruction" *Applied Surface Science* 229:148-160 (2004).

Invitation to Pay Additional Fees with Communication Relating to the Results of the Partial International Search, PCT/US2007/007406, Sep. 10, 2007.

Notification of Transmittal of the International Search Report and the Written Opinion of the International Searching Authority, or the Declaration, International Search Report, and Written Opinion of the International Searching Authority, PCT/US2007/007406, Nov. 5, 2007.

METHODS AND APPARATUS FOR PROCESSING A LARGE AREA PULSED LASER BEAM TO CREATE APERTURES THROUGH MICROLENS ARRAYS

Cross-Reference to Related Application

This application is a continuation of Application No. 11/382,163, filed May 8, 2006 now U.S. Pat. No. 7,394,594, entitled Methods and Apparatus for Processing a Pulsed Laser Beam to Create Apertures Through Microlens Arrays, and Products Produced Thereby, assigned to the assignee of the present application, the disclosure of which is hereby incorporated herein by reference in its entirety as if set forth fully herein.

FIELD OF THE INVENTION

This invention relates to microfabricating methods, apparatus and devices so fabricated, and more particularly to methods and apparatus for fabricating optical microstructures and optical microstructures fabricated thereby.

BACKGROUND OF THE INVENTION

Substrates having a microlens array on one side thereof and an array of self-aligned apertures on the other side thereof, are widely used as optical components in computer displays (monitors), projection televisions, flat panel displays and televisions, and many other optical applications. As is well known to those having skill in the art, a microlens array includes a large number of microlenses, at least one dimension of a base of which (a "base dimension") is less than about 100 μm in size. Hemispherical, anamorphic, lenticular and/or other conventional microlens arrays may be formed. The self-aligned apertures may be created in a layer, such as an opaque and/or reflective layer, by impinging a laser through the microlenses onto the layer.

For example, U.S. Pat. No. 4,172,219 to Deml et al., entitled Daylight Projection Screen and Method and Apparatus for Making the Same, issued Oct. 23, 1979, describes such a technique for forming self-aligned apertures. As noted in the abstract of Deml et al., a layer of material which absorbs incident focused laser light and undergoes a resultant heating is arranged in the focal plane of a lens matrix. Laser light is projected onto such layer through the lens matrix itself. The laser light is focused by the lens elements of the lens matrix onto the layer effecting a highly localized heating of small well-defined portions of the layer. At those small well-defined portions, the material of the layer, as a result of the highly localized heating, removes itself to form the apertures of a lens-aperture matrix which is thereafter used in cooperation with the lens matrix as a rear projection or daylight projection screen.

Another technique for creating self-aligned apertures in a layer is described in U.S. Pat. No. 4,666,248 to van de Ven, entitled Rear-Projection Screen, issued May 19, 1987. As noted at Column 3, lines 51-61 of the van de Ven patent, a method of manufacturing a rear-projection screen in accordance with the invention is characterized in that the following steps are carried out in the given sequence: replicating on a first side of a thin transparent foil an anamorphotic lens structure formed in a mould, applying a light-sensitive material to the second side of the transparent foil, exposing the light-sensitive material through the lens structure, developing the light-sensitive material in such a way that non-exposed parts become opaque, and attaching the second side of the foil to a transparent supporting sheet.

Yet other techniques for forming self-aligned apertures are described in U.S. Pat. No. 6,967,779 to Fadel et al., entitled Micro-Lens Array With Precisely Aligned Aperture Mask And Methods Of Producing Same, issued Nov. 22, 2005, and assigned to the assignee of the present application. As noted in the Abstract of the Fadel et al. patent, a micro-lens array with a precisely aligned aperture mask, and a method of forming the same, is provided. The aperture mask is formed by projecting light onto a mask layer using each lenslet in the micro-lens array. The intensity of the light and the mask layer material are chosen so that the light forms apertures in the mask layer via a non-ablative process. The resulting apertures are automatically aligned with their respective lenslets.

Despite the disclosure of self-aligned aperture formation techniques using a laser beam in the Deml et al. patent over 25 years ago, commercial use of laser beams to create self-aligned apertures through a microlens array do not appear to be widespread. In particular, since a laser produces a relatively small beam of light, aperture creation processes for large substrates, such as substrates having at least one dimension that is about 30 inches or more, may provide low throughput. Moreover, attempts to expand the size of the laser beam that impinges on the apertures may create lack of uniformity over the area of the expanded beam, which may result in the creation of non-uniform apertures. Non-uniform apertures may, in turn, create unacceptable visible defects when the substrates are used in optical applications.

SUMMARY OF THE INVENTION

Some embodiments of the invention provide methods of optically processing a pulsed laser beam, to create apertures in a layer on a back side of a substrate that includes a microlens array on a front side thereof. In some embodiments, the pulsed laser beam is focused in a vacuum spatial filter. A profile, such as a Gaussian profile, of the pulsed laser beam that emerges from the vacuum spatial filter is converted to a top hat profile having relatively uniform transverse intensity. The laser beam having the top hat profile is diffused. Finally, the pulsed laser beam having the top hat profile that has been diffused is impinged through the microlens array on the front side of the substrate and onto the layer on the back side of the substrate.

In some embodiments, the pulsed laser beam is focused in the vacuum spatial filter under a vacuum of between about 50 mTorr and about 100 mTorr. In other embodiments, the pulsed laser beam is focused in the vacuum spatial filter under a vacuum that is configured to maintain a continuous plasma at a focal point of the pulsed laser beam. In other embodiments, the vacuum is also configured to prevent substantial absorption of the pulsed laser beam in the vacuum spatial filter. In some embodiments, the profile of the pulsed laser beam that emerges from the vacuum spatial filter is converted to a top hat profile by passing the pulsed laser beam that emerges from the vacuum spatial filter through a diffractive optical element. In some embodiments, the diffractive optical element is configured to convert a circular Gaussian profile of the pulsed laser beam that emerges from the vacuum spatial filter to a rectangular, and in some embodiments square, top hat profile of relatively uniform intensity.

In some embodiments, the pulsed laser beam having the top hat profile is diffused by at least partly destroying coherency of the pulsed laser beam having the top hat profile. In other embodiments, diffusing takes place by passing the pulsed laser beam having the top hat profile through a substrate having a diffusive surface and/or a diffusive interior.

In other embodiments, the pulsed laser beam having the top hat profile that has been diffused is impinged on the layer on the back side of the substrate through the microlens array on the front side of the substrate, by moving the substrate in a given direction while rastering the pulsed laser beam having the top hat profile that has been diffused across the substrate, perpendicular to the given direction, to create the apertures. In some embodiments, the movement of the substrate and the rastering of the pulsed laser beam are performed, so as to overlap impingement areas of the pulsed laser beam having the top hat profile that has been diffused in the substrate, in both the given direction and perpendicular to the given direction.

In some embodiments, the substrate that includes the microlens on the front side thereof and the layer on the back side thereof is used for visible light applications, and the pulsed laser beam is a pulsed laser beam having longer wavelength than visible light. In some embodiments, the pulsed laser beam is a pulsed infrared laser beam.

In some embodiments, the pulsed laser beam having the top hat profile that has been diffused, is at least one square inch in area, and is sufficiently uniform in power to create apertures in the layer on the back side of the substrate through all of the microlenses in the microlens array on the front side thereof, on which the at least one inch square pulsed laser beam having the top hat profile impinges, wherein the microlenses include at least one base dimension that is less than about 100 μm in size. In other embodiments, the pulsed laser beam having the top hat profile that has been diffused and is of at least one inch square in area, is sufficiently uniform in power to create apertures in the layer on the back side of the substrate through the microlens in the microlens array on the front side thereof, on which the at least one inch square pulsed laser beam having the top hat profile impinges, without visible defects. In other embodiments, non-visible defects are created that have a periodicity of at least about one inch. In still other embodiments, at least some of the apertures include debris from the layer in the centers thereof.

Embodiments of the present invention have been described above in terms of the combination of focusing the pulsed laser beam in a vacuum spatial filter, converting a profile of the pulsed laser beam that emerges from the vacuum spatial filter to a top hat profile, diffusing the pulsed laser beam having the top hat profile, and impinging the pulsed laser beam having the top hat profile that has been diffused onto a substrate for aperture creation, using longer wavelengths than visible light. However, other embodiments may provide subcombinations of focusing the pulsed laser in a vacuum spatial filter, converting the profile to a top hat profile, and diffusing the pulsed laser beam having the top hat profile by performing one of these operations on the pulsed laser beam or combinations of two of these operations on the pulsed laser beam. In some embodiments, longer wavelengths than visible light also may be used.

It will be understood by those having skill in the art that embodiments of the invention have been described above with respect to methods of optically processing a pulsed laser to create apertures. However, analogous apparatus for optically processing a pulsed laser beam to create apertures also may be provided according to other embodiments of the present invention. These apparatus may include a vacuum spatial filter, a diffractive optical element that is configured to convert a profile to a top hat profile, a diffuser screen that is configured to diffuse the pulsed laser beam having the top hat profile and/or a rasterizing apparatus that is configured to move the substrate in a given direction while rastering the pulsed laser beam perpendicular to the given direction. A laser having a longer wavelength than visible light also may be used. Combinations and subcombinations of these elements also may be provided according to other embodiments of the present invention.

Moreover, other embodiments of the present invention can provide microlens array products that are fabricated according to any of the methods and/or using any of the apparatus described above. For example, microlens array products may include a substrate, a microlens array on a front side thereof, and a layer including an array of apertures corresponding to the microlens array on the back side thereof, wherein the microlenses include at least one base dimension that is less than about 100 m in size and wherein the apertures include non-visible defects that have a periodicity of at least about one inch. Substrates having at least one dimension that is at least 30 inches also may be provided

DETAILED DESCRIPTION

Figure 1:
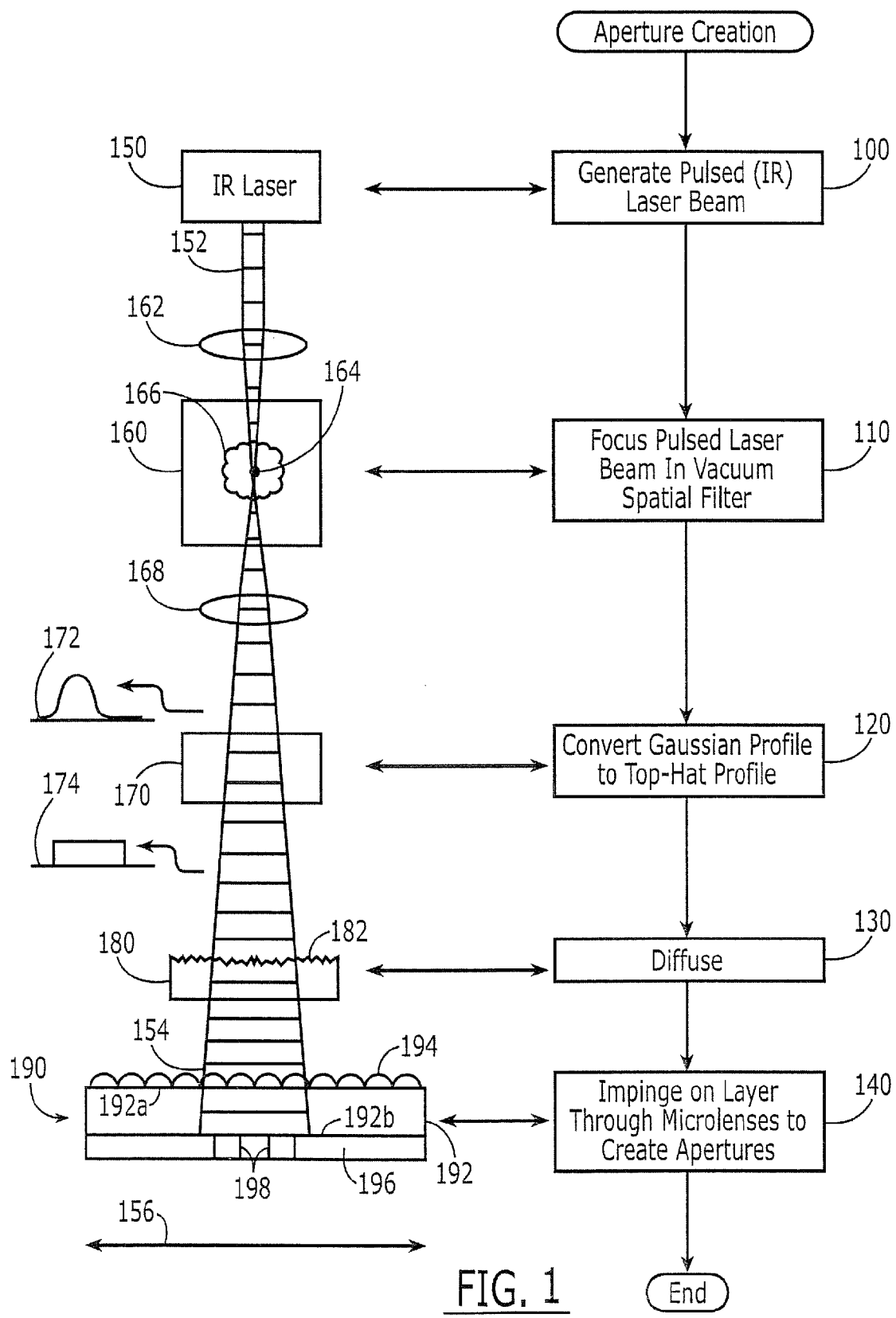
FIG. 1 is a flowchart of methods of optically processing a pulsed laser beam to create apertures according to various embodiments of the present invention, and also includes a schematic block diagram of apparatus for optically processing a pulsed laser beam to create apertures according to various embodiments of the present invention, corresponding to blocks of the flowchart.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or"

includes any and all combinations of one or more of the associated listed items and may be abbreviated as "/".

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "having," "having," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Finally, when light is referred to as "directly passing," it means that a reflector-free path is provided.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. Moreover, the terms "front" and "back" may be used herein to describe opposing outward faces of a display screen. In some embodiments, "front" is used to denote the side of a surface, such as a substrate, first encountered by a pulsed laser beam and "back" is used to denote the opposite side of the surface. Moreover, conventionally, the viewing face may be deemed the front, but the viewing face may also be deemed the back, depending on orientation.

Embodiments of the present invention are described herein with reference to cross section and perspective illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

FIG. 1 is a flowchart of methods of optically processing a pulsed laser beam to create apertures according to various embodiments of the present invention, and also includes a schematic block diagram of apparatus for optically processing a pulsed laser beam to create apertures according to various embodiments of the present invention, corresponding to blocks of the flowchart. In particular, FIG. 1 illustrates embodiments of optically processing a pulsed laser beam 152 that may be generated by a pulsed laser at Block 100, to create apertures 198 in a layer 196 which may be an optically-absorbing layer such as a black layer and/or a reflective layer, such as an aluminum and/or nickel layer, on the back side 192b of a substrate 192 that includes a microlens array 194 on a front side 192a thereof. The substrate 192 including the microlens array 194 and the layer 196 may be referred to collectively as a "lens sheet" 190. The lens sheet 190 itself may be fabricated as described in U.S. Patent Application Nos. 2006/0061869; 2005/0058947; 2005/0058948; 2005/0058949 and/or 2003/00206342; and/or U.S. Pat. Nos. 6,967,779; 6,829,087 and/or 6,816,306 and/or U.S. application Ser. Nos. 11/113,846; 11/179,162 and/or 11/364,423, all of which are assigned to the assignee of the present invention, the disclosures of which are hereby incorporated herein by reference in their entireties as if set forth fully herein. Other techniques of fabricating the lens sheet 190 also may be used.

The microstructures 194 may include a one- or two-dimensional array of microlenses having at least one base dimension (i.e., a dimension adjacent the substrate 192) that is less than about 100 µm in size. Lenticular, hemispherical, anamorphic and/or other microlens arrays may be provided, depending upon the optical application for the lens sheet 190. The microstructures 194 need not be uniform in size, shape or orientation. As used herein, a "lens" includes any transmissive, diffractive and/or refractive optical element, and a "microlens" includes any transmissive, diffractive and/or refractive optical element having at least one base dimension that is less than about 100 µm.

The pulsed laser beam 152 that is generated at Block 100 may be generated by a laser, such as a pulsed Nd:YAG laser. Moreover, when the lens sheet 190 is used for visible light applications, some embodiments of the invention provide a pulsed infrared (IR) laser 150 that produces a pulsed infrared laser beam 152. In other embodiments, other lasers having a longer wavelength than visible light may be used. By creating apertures using laser beams having a longer wavelength than visible light, improved aperture creation may be provided, as will be described in detail below, compared to conventional applications that use ultraviolet (UV) lasers or other lasers having shorter wavelengths than visible light.

Referring again to FIG. 1, at Block 110, the pulsed laser beam 152 is focused in a vacuum spatial filter 160. In particular, as shown in FIG. 1, the pulsed laser beam 152 may be focused by a focusing lens 162, such that the focal point 164 is created in a vacuum that is maintained by the vacuum spatial filter 160. In some embodiments, the vacuum spatial filter 160 creates a vacuum of between about 50 mTorr and about 100 mTorr. The amount of vacuum may be configured to include sufficient residual gas content so as to generate and maintain a continuous plasma 166 at the focal point 164 of the pulsed laser beam 152. The amount of vacuum may also be configured to not be so gas filled, so as to prevent substantial absorption of the pulsed laser beam 152 in the vacuum spatial filter 160, snapping, burning or other undesirable effects. As used herein, a "continuous plasma" means a plasma that is not extinguished between pulses of the pulsed laser beam 152.

The vacuum spatial filter 160 can improve the uniformity of the pulsed laser beam 152 in the transverse direction (orthogonal to its direction of travel). In particular, as is well known to those having skill in the art, even a high vacuum may contain a very low content of nitrogen, oxygen, water and/or other constituents. A plasma may be created by the presence of oxygen, argon and/or other some other gas element that can burn or create an ion cloud. A very low vacuum, for example less than 1 mTorr, may need an electron source and/or other external excitation source to maintain a plasma. Conversely, a vacuum of about 500-1000 mTorr might be sufficient to begin to cause snapping or minor explosions of the residual gases that may disrupt the laser beam. Accordingly, some embodiments of the invention provide a vacuum that is configured to maintain a continuous plasma at a focal point of the pulsed laser beam, without the need for external excitation sources, and to prevent substantial absorption of the pulsed laser beam in the vacuum spatial filter. Accordingly, in some embodiments of the invention, a vacuum between about 1 mTorr and about 500 mTorr may be maintained, and in other embodiments, a vacuum between about 50 mTorr and about 100 mTorr may be maintained.

Upon exiting the vacuum spatial filter 160, an additional lens 168 may be used to further collimate the pulsed laser beam that emerges from the vacuum spatial filter 160, if desirable. The pulsed laser beam that emerges from the vacuum spatial filter 160 may have a generally Gaussian transverse profile in either or both orthogonal transverse directions, as shown by the Gaussian graph 172.

Still referring to FIG. 1, at Block 120, the profile, such as the Gaussian profile 172, of the pulsed laser beam that emerges from the vacuum spatial filter 160 is converted to a "top hat" profile of substantially uniform transverse amplitude or intensity, as shown graphically at 174. In some embodiments, the Gaussian profile 172 is converted to a top hat profile 174 by passing the pulsed laser beam through a diffractive optical element 170 that is configured to convert a circular Gaussian profile of the pulsed laser beam that emerges from the vacuum spatial filter 160 to a rectangular, and in some embodiments square, top hat profile of relatively uniform intensity.

Continuing with the description of FIG. 1, at Block 130, the pulsed laser beam 152 having the top hat profile 174 is diffused, for example, by passing the pulsed laser beam 152 having the top hat profile 174 through a substrate 180 having a diffusive surface 182 thereon and/or having a diffusive interior. Substrates having a diffusive interior, also referred to as "volume diffusive" substrates, may be provided using sheets of extruded plastic with beads, air bubbles and/or other diffusive components in the interior thereof. In some embodiments, by diffusing the pulsed laser beam 152 having a top hat profile 174, the coherency of the pulsed laser beam 152 having the top hat profile 174 is at least partially destroyed, which can further improve the uniformity thereof.

Finally, at Block 140, the pulsed laser beam having the top hat profile that has been diffused 154 is impinged on the layer 196 through the microlens arrays 194, to create the apertures 198. At the point where the pulsed laser beam having the top hat profile that has been diffused 154 impinges on the microlens array 194, it may have an area of at least about one inch square. Accordingly, up to millions or more of apertures 198 (for example, hundreds of millions or more) may be created by a single pulse of the pulsed laser beam having the top hat profile that has been diffused 154. It has been found, according to some embodiments of the present invention, that each of the microlenses 194 through which the pulsed laser beam having a top hat profile that has been diffused 154 passes, can create at least one corresponding aperture 198. In other embodiments, the apertures 198 can be sufficiently uniform so as to avoid any visible defects. As used herein, visible defects mean defects that are visible to a user of the lens sheet 190 in its intended application. Moreover, in other embodiments, only non-visible defects may be created.

In some embodiments, the pulsed laser beam having the top hat profile that has been diffused 154 is impinged on the layer 196 through the microlens array 194 by moving the lens sheet 190 in a given direction, for example into or out of the plane of FIG. 1, while rastering the pulsed laser beam having the top hat profile that has been diffused 154 across the lens sheet 190, perpendicular to the given direction, as shown by arrow 156. The lens sheet 190 may be held by a conveyor or other holder, as described below. Rastering may be provided by a rasterizer, as described below. Rastering 156 may take place along substantially the extent of the lens sheet 190 in the perpendicular direction (horizontally in FIG. 1), for example at a rastering distance of up to about 30" or more, so that large area lens sheets 190 may be processed. In processing these large lens sheets 190, any non-visible defects (and any visible defects that may be present) may have a periodicity of at least about one inch due to the size of the pulsed laser beam having the top hat profile that has been diffused 154. Accordingly, lens sheets 190 that have been processed according to some embodiments of the present invention, may have defects (visible and/or non-visible) in the apertures 198 thereof that have a periodicity of at least about one inch, to thereby provide a telltale sign that methods/apparatus according to embodiments of the present invention have been used.

Lens sheets 190 that are fabricated according to other embodiments of the present invention may also provide a diffuse center in the substrate or on the surface of the aperture as a residue from the removed layer that creates the apertures. This debris or residue in the center of an aperture may also be a telltale sign that methods/apparatus according to embodiments of the present invention have been used. The diffuse centers may be of the order in size of some color of wavelength of light, and may cause absorption of shorter wavelengths of light. Without wishing to be bound by any theory of operation, it is theorized that when a high power laser, for example on the order of 50 Watts, is used to create apertures compared to a lower power laser, for example on the order of less than about 1 Watt, material is either redeposited or left behind, which can cause debris in centers of the apertures (i.e., remote from the aperture edges) as an artifact of the method/system.

Figure 16A:
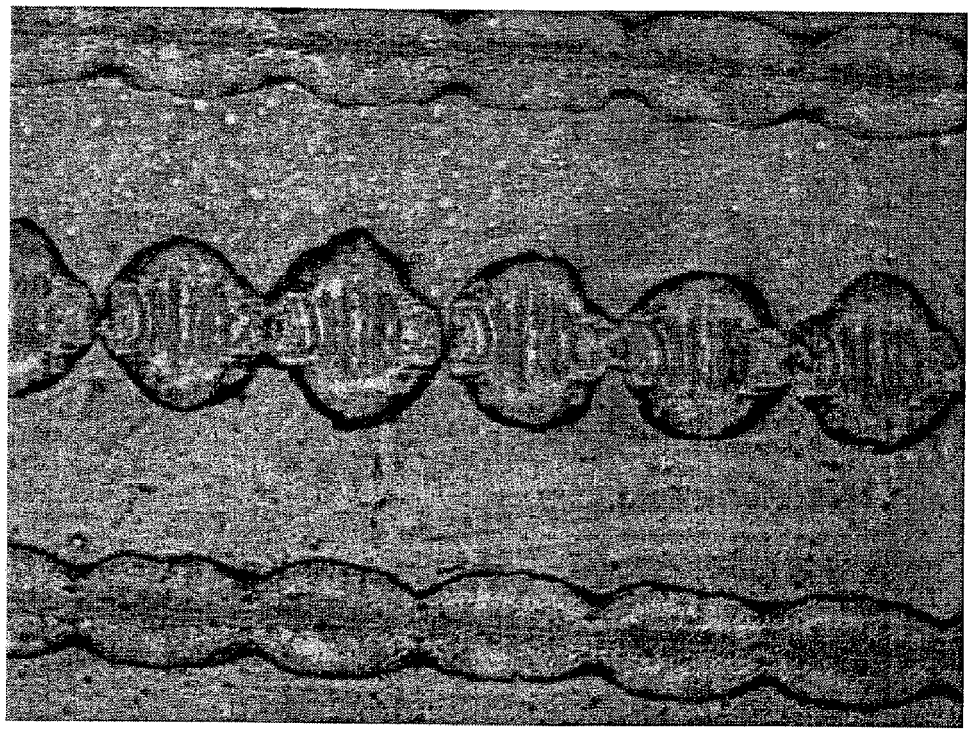
FIG. 16A is a microphotograph of apertures that may be created according to some embodiments of the invention.
Figure 16B:
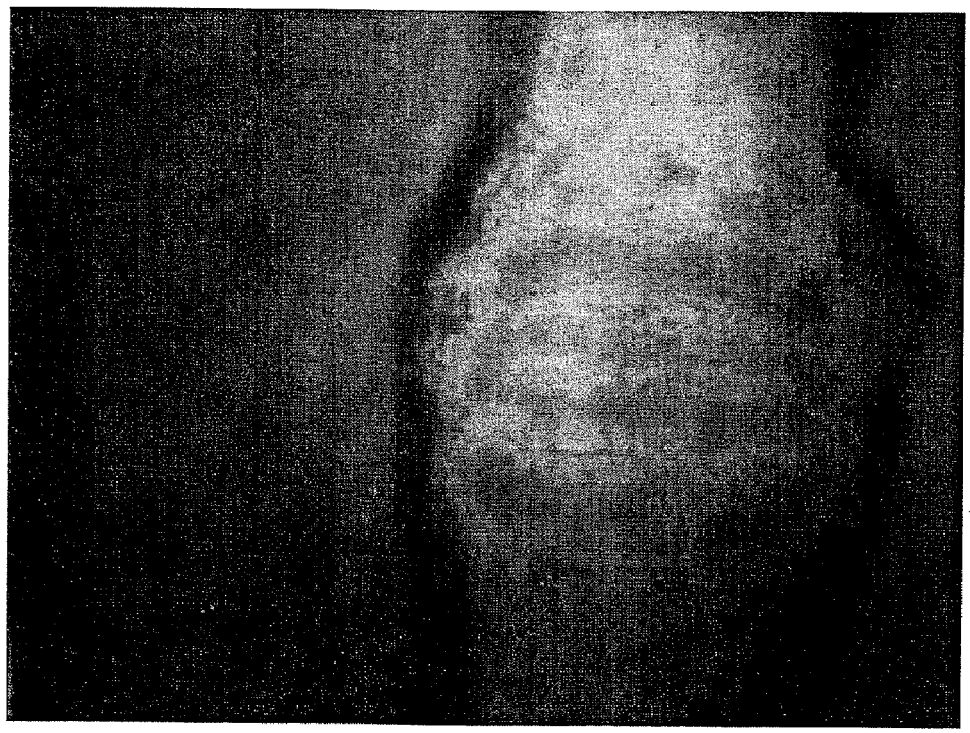
FIG. 16B is a close-up microphotograph of an aperture of FIG. 16A.

FIG. 16A is a microphotograph illustrating material that is redeposited or left behind in the centers of apertures, according to some embodiments of the invention. It can be observed in the center of the apertures that the debris that remains can cause a loss of light transmission through an aperture, which may be on the order of about 1% to about 8%. This may also be observed in a curve of the percentage transmission vs.

wavelength of light, where this loss in transmission occurs where the shorter wavelengths absorb more light caused by the size of the degree. The debris may be in the form of striations as shown in FIG. 16A, in the form of other patterns and/or random. FIG. 16B is a close-up of one aperture that is backlit, and illustrates light absorption by the debris in the center of the aperture.

Figure 2:
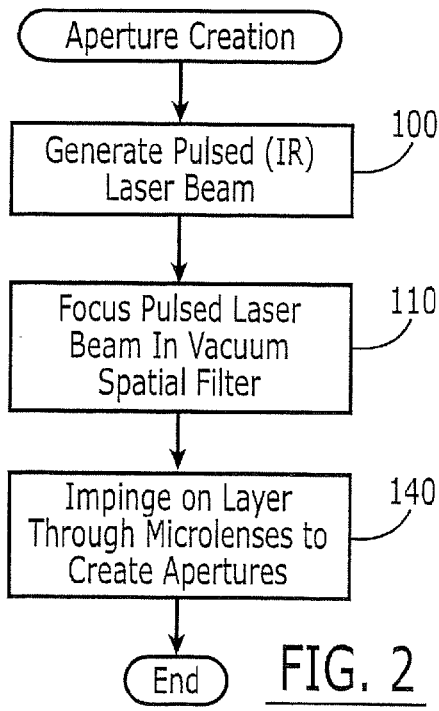
FIGS. 2-7 are flowcharts of embodiments of the invention that use subcombinations of the elements/steps shown in FIG. 1.
Figure 3:
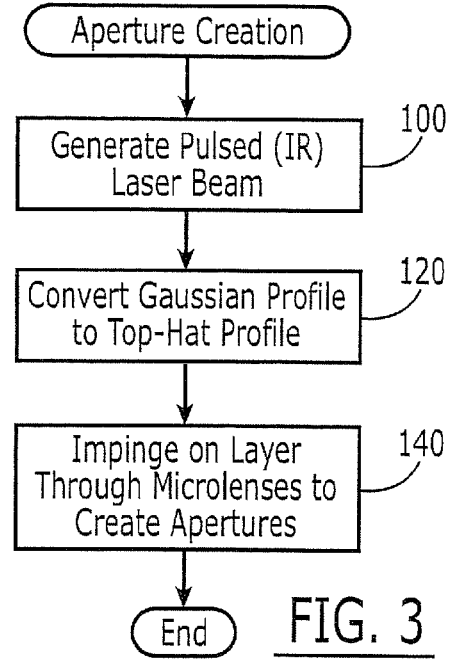
Figure 4:
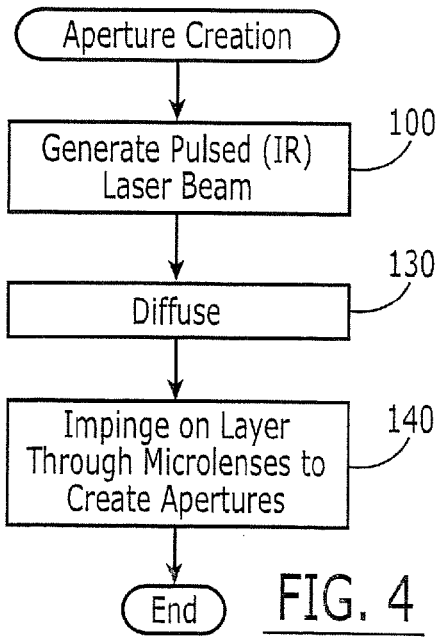

In other embodiments of the invention, subcombinations of the elements shown in FIG. 1 may be used to optically process a pulsed laser beam to create apertures in the layer 196 on the back side 192b of the substrate 192 that includes a microlens array 194 on the front side 192a thereof. FIGS. 2-7 illustrate these various combinations and subcombinations. In particular, FIG. 2 illustrates generating a pulsed laser beam at Block 100, focusing the pulsed laser beam in a vacuum spatial filter at Block 110 and impinging the focused pulsed laser beam that emerges from the vacuum spatial filter on the layer 196 through microlenses 194, to create apertures 198 at Block 140. FIG. 3 illustrates generating a pulsed laser beam 100, converting the profile, such as the Gaussian profile, to a top hat profile at Block 120 and impinging at Block 140. FIG. 4 illustrates generating a pulsed laser beam 100, diffusing the pulsed laser beam at Block 130 and impinging at Block 140.

Figure 5:
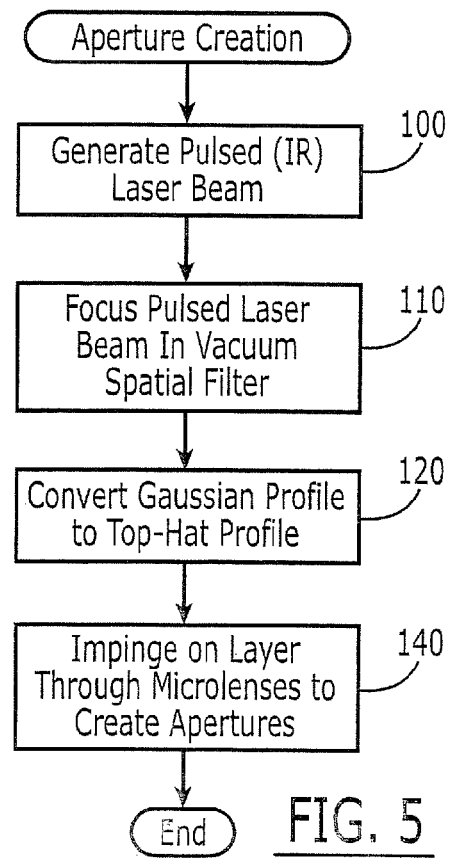
Figure 6:
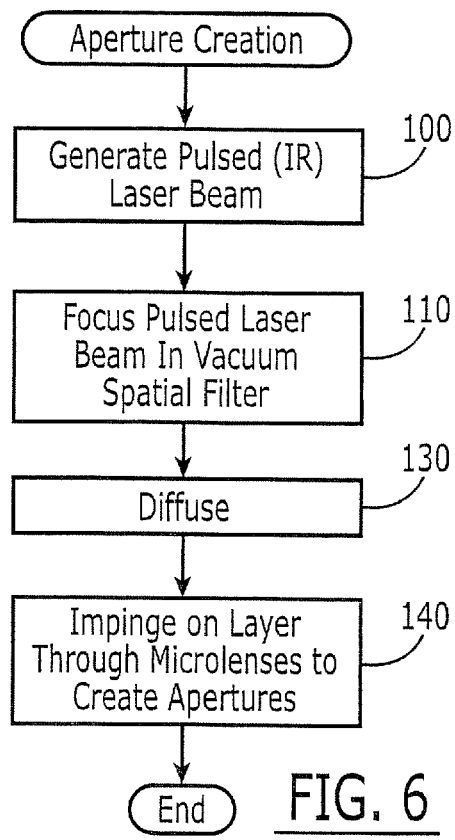
Figure 7:
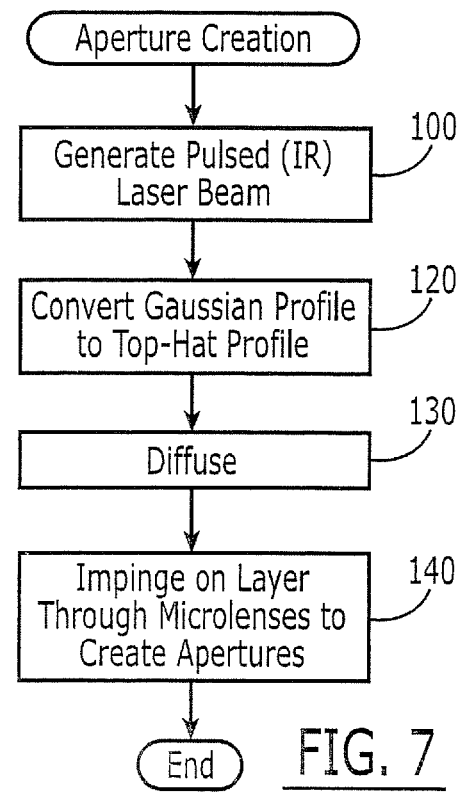

FIG. 5 illustrates generating a pulsed laser beam at Block 100, focusing the pulsed laser beam in a vacuum spatial filter at Block 110, converting a profile, such as a Gaussian profile, to a top hat profile at Block 120 and impinging at Block 140. FIG. 6 illustrates generating a pulsed laser beam 100, focusing the pulsed laser beam in a vacuum spatial filter at Block 110, diffusing the beam that emerges from the vacuum spatial filter at Block 130 and impinging at Block 140. Finally, FIG. 7 illustrates generating a pulsed laser beam at Block 100, converting the profile, such as the Gaussian profile, to a top hat profile at Block 120, diffusing at Block 130 and impinging at Block 140.

In any or all of the embodiments of FIGS. 2-7, the pulsed laser beam may be a pulsed laser beam having longer wavelength than visible light, such as a pulsed infrared laser beam. However, in other embodiments, pulsed visible laser beams or pulsed laser beams having shorter wavelengths than visible light, such as pulsed ultraviolet laser beams, may be used. Analogous apparatus to those described in FIG. 1, but including only the Blocks shown in FIGS. 2-7, also may be provided according to various embodiments of the present invention.

Additional discussion of embodiments of the present invention that were described above in connection with FIGS. 1-7, and of other embodiments of the present invention will now be provided. Without wishing to be bound by any theory of operation, operating theories also will be provided. Operating parameters of some specific embodiments of the present invention also will be provided.

Processes and apparatus have been developed, according to various embodiments of the present invention, to enable the formation of self-aligned apertures opposite to a lens, lens arrays and/or other optical elements. The processes, equipment and/or articles (lens sheets) that result can enable aperture formation in a controlled fashion, where the location, the shape, the size, the edge detail, number of apertures per lens, the length of aperture and/or other parameters may be controlled. The formation of these apertures in combination with organic, inorganic, reflective, absorptive and/or other optically active and/or optically neutral films can provide light, electronic and/or other management films.

According to some embodiments of the invention, a beam 152 of laser light, which generally is singularly directional, monochromatic and coherent light, is processed via one or more optical elements to produce a relatively uniform (relative to the intensity profile of the beam) beam 154 that is set incident upon a lens, lens arrays, or optical element 194.

Where the optical element or lens 194 has coated on the opposite side of the lens a layer 198 (also referred to as a thin film or simply as a film), that film 198 will become ablated, removed, vaporized and/or destroyed in the presence of the generally focused beam. The shape (round, square, elongated) and character (sharp, rough edges) of this removal may depend to a great extent upon the lens shape and its impact on creating an area of focus for the beamlets that form or are created by the lens array 194, and/or the energy deployed to execute this removal. The hole or aperture 198 (in terms of its shape and/or appearance of its edges) created, may be generally dictated by the optical characteristics of the lens 194 and this aperture 198 can be altered in shape and character by additional techniques beyond that dictated by the lens shape, as will be described below.

Additionally, for applications where the apertures 198 are used as part of a spatial filter function, such as applications for many light management functions, the size of the apertures 198 relative to the application may be determined to reduce or avoid light cutting (blockage of part of the light by the edge of the film 196) or light loss at the edges of the apertures 198. Lost light may be produced when the aperture created is not sufficiently large to allow for the full passage of light that is directed through the lens 194 to the layer 196. Conventionally, some aberration in the lens 194 or light directed from angles may not have provided enough energy during aperture creation to enable the apertures 198 to be sized correctly in a process that does not have these added methods of control. According to some embodiments of the invention, the wavelength of the laser, destruction of the coherency (in some embodiments, within some immediate distance from the film), overlay films to alter the index of refraction and/or other techniques, may be used to alter the aperture opening. The angle of the incident beam and/or multiple beams also may be used to modify the aperture opening. However, these last listed solutions may be more costly and/or less controllable.

High-speed aperture creation also may be desirable to provide for widespread commercialization. The uniformity of ablation may be provided via use of a pulsed beam 152 with a pulse width of, for example, less than about 10 ns. The resulting peak optical power may be tens of megawatts per pulse. Typically, pulsed lasers are used in a manner in which many pulses are averaged together to create or use in an application. In contrast, in some embodiments of the invention, each pulse is used to create apertures and the following pulse will be used to create new apertures, since a re-exposure of the laser 150 to an already created aperture 198 may have little effect on the existing aperture 198 or on further aperture formation. In particular, aperture creation is generally not a sum of energy process, nor may the unstable characteristics of the laser generally be summed to achieve uniformity. Rather, a single step, single pulse process is provided by some embodiments of the invention, whereby the apertures 198 open and their size and relative character are determined by the shape of the light of each pulse.

Figure 8:
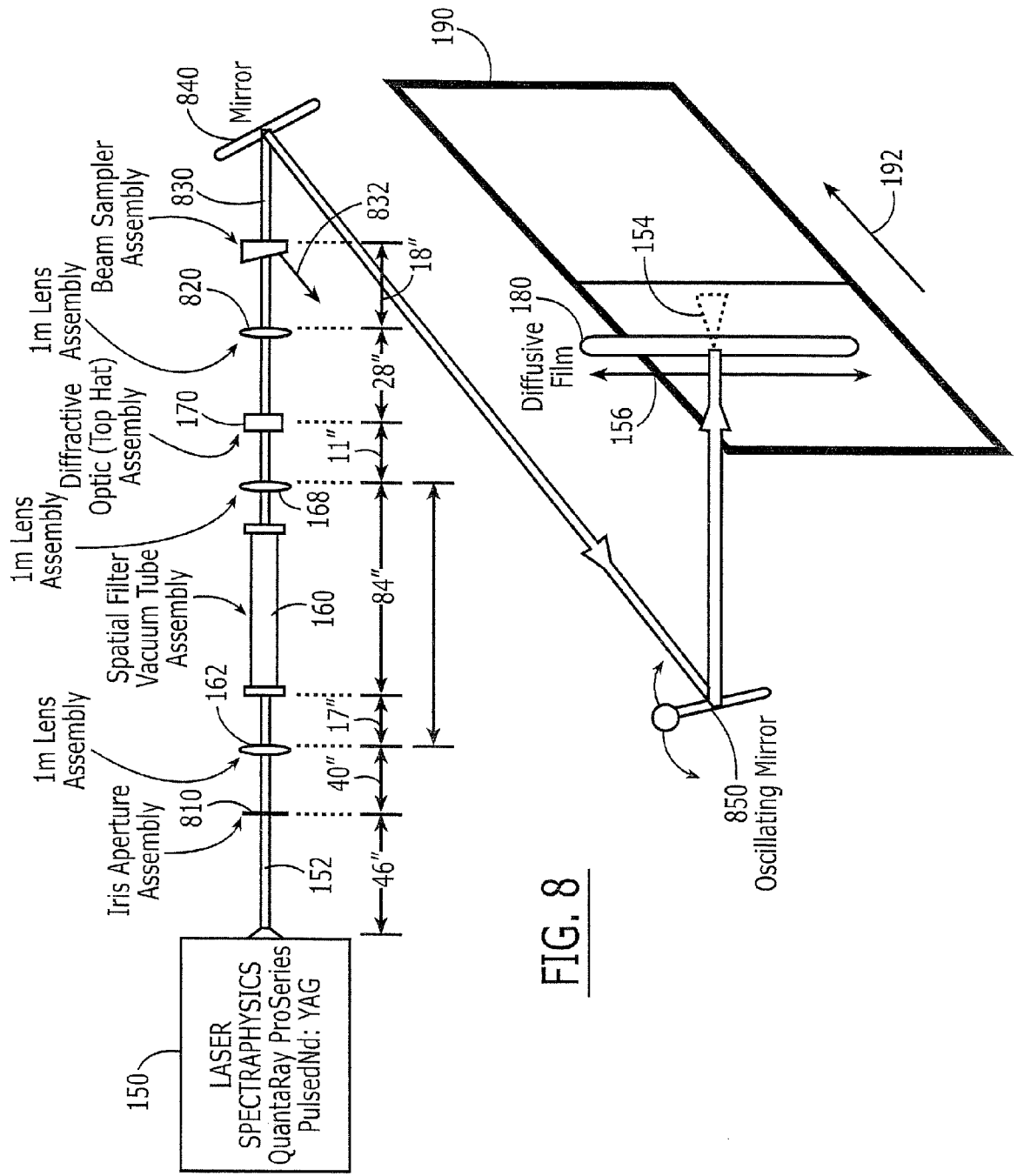
FIG. 8 is a block diagram of apparatus and methods of other embodiments of the present invention.

FIG. 8 is a block diagram of apparatus and methods according to other embodiments of the invention, illustrating other optical elements that may be used and the relative placement of the elements, according to some embodiments of the invention. Like numbering with FIG. 1 is used when appropriate.

In some embodiments, the high peak power of a Q-switched Nd:YAG laser 150, such as a Spectra Physics Quanta Ray Pro Series 350 laser, is deployed. The power of a Q-switch system is commonly known to build up over about 200 ms and is released into a pulse width of less than about 10 ns to yield a peak optical power of tens of megawatts. The laser beam 152 is then sent through a series of elements to form a relatively uniform beam from the perspective of power distribution.

Figure 9A:
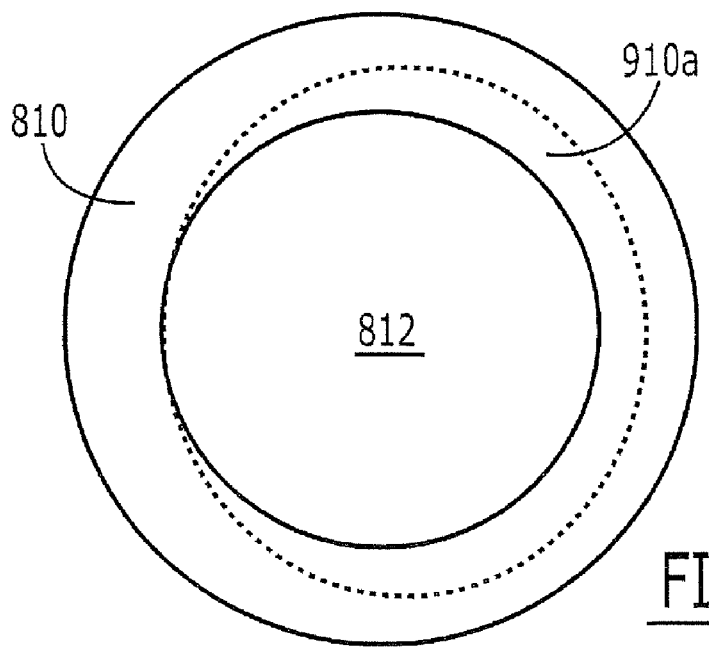
FIGS. 9A and 9B are a plan view and a cross-sectional view, respectively, illustrating operation of an iris on an incoming laser beam according to some embodiments of the present invention.
Figure 9B:
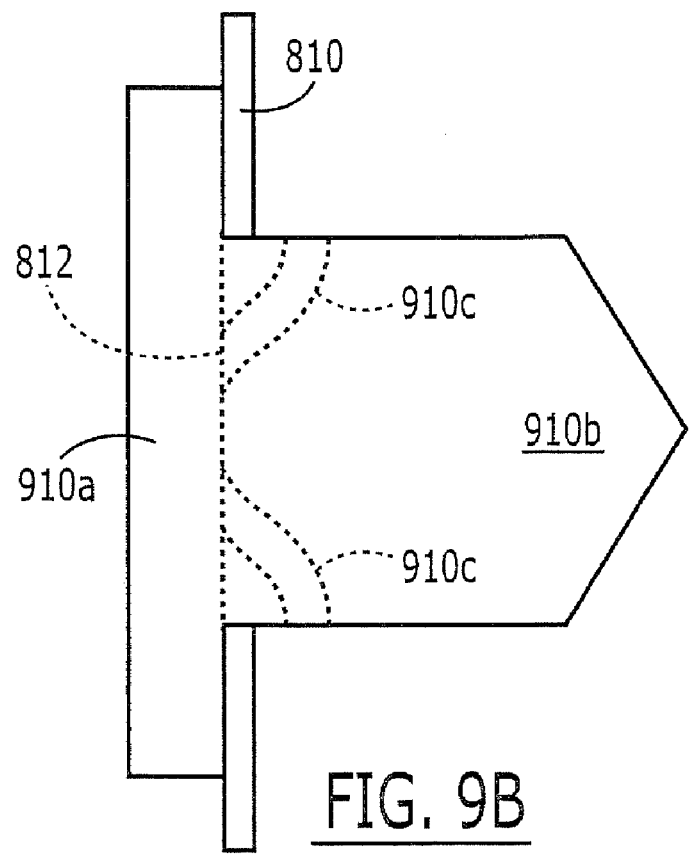

In some embodiments, the first element in this assembly may be an optical iris 810, which may be used to help create a rounded shaped beam. For high power Q-switched systems, the instability of the beam (or its creation via a discharge process, which is inherently unstable) may result in a non-symmetric beam profile as the power and cycles per second are increased. In some embodiments, an iris 810 may be used create a more stable beam profile. FIGS. 9A and 9B are a plan view and a cross-sectional view, respectively, illustrating operation of an iris 810 on an incoming laser beam 910a. As shown in FIG. 9A, the iris 810 may comprise a ring with an aperture 812 that is sized to a desired diameter of the emerging laser beam. As the laser beam 910a (which may correspond to the laser beam 152 of FIG. 8) impinges on the iris 810, the aperture 812 provides an emerging beam 910b that is of more uniform and stable size, by cutting off edges and intensities that are outside the aperture 812. The iris 810 can have potential deleterious effects, however, because, at each point where the ring 810 cuts off a beam intensity, the point of intersection with the beam may create a new intensity. The interaction of this new intensity with the beam can give rise to an extension contour later in the beam profile, as indicated by the new intensities 910c. The intensity extinctions caused by the new intensities 910c that are initiated into the emerging laser beam 910b may or may not be significant in the ultimate intensity variation.

In some embodiments, a 30 Hz laser system 150 (i.e., 30 pulses per second) with a Q-switched total power output of about 50 Watts (as measured by a pyrolitic meter) is deployed. The iris 810 can cause the initiation of multiple extinctions to propagate through the beam profile. Accordingly, in some embodiments the iris 810 may be designed to intersect a reduced or minimal part of the incoming beam 910a when used.

Referring again to FIGS. 1 and 8, a lens 162, such as a one-meter lens, is then used to begin to focus the energy of the beam approximately at one-meter from the lens 162 to a focal point 164 and to cross rays and eventually expand. In some embodiments, this crossing of the beam 152 at the focal beam 164 is made to take place in a vacuum which was put in place so as to not cause the ignition of air at the point of crossing 164. Conventionally, this crossing would generally merely result in the inverted image to be transferred about two meters from the intersection of the one-meter lens to a second lens 168, such as a second one-meter lens, which can serve to collimate the light. In some embodiments of the invention, the vacuum in the vacuum spatial filter (also referred to as a "spatial filter vacuum tube assembly") 160, is set to approximately 100 mTorr and, in some embodiments, between about 50 mTorr and about 100 mTorr.

It has been found, unexpectedly, according to some embodiments of the invention, that the uniformity of the beam may be enhanced by the creation of a plasma 166 at the point of crossing (focal point) 164 and the following pulse of the beam 152 (if occurring shortly after the previous pulse) will still find present a remaining plasma 166 from the previous pulse, resulting in some gross enhancement of uniformity by passing through this plasma 166. In contrast, the lack of the lens 162, vacuum spatial filter 160 and final lens 168 may result in a less uniform beam. Stated differently, without the vacuum spatial filter 160, some embodiments of the invention may not function either as efficiently or as effectively with the diffractive optic 170 which was designed with an expectation of seeing an almost perfectly Gaussian profile 172 of the beam. The homogenization of the beam 152 by interaction of the beam with the plasma 166 created within the vacuum spatial filter 160 can enable full use of the light intensity as a more homogeneous source than might be able to be obtained by other techniques.

Since both the centroid of the beam 152 may fluctuate about the center and various extinctions and power distributions may exist in the beam profile, it may be highly desirable to enhance the beam's uniformity. The use of this plasma 166, according to some embodiments of the invention, can serve a purpose to enhance the beam delivery system and enable a stable Gaussian beam as depicted at 172.

The amount of vacuum in the vacuum spatial filter 160 may depend on the specific parameters of the laser 150 and/or other parameters of the system/method. However, in some embodiments, the vacuum has sufficient residual gas content to maintain the continuous plasma 166 at the focal point 164 of the pulsed laser beam 152, but is not so gas filled so as to cause substantial absorption of the pulsed laser beam 152 in the vacuum spatial filter 160 or snapping and/or burning of the gas.

The nearly perfect Gaussian profile 172 of the beam is made to fill the diffractive optical element 170. The diffractive element 170 may be configured to convert the Gaussian profile 172 to, for example, a square of 635 mm×635 mm spot at 20 meters, and may be supplied by HOLO-OR, Ltd., based in Israel, and/or other vendors.

Figure 10:
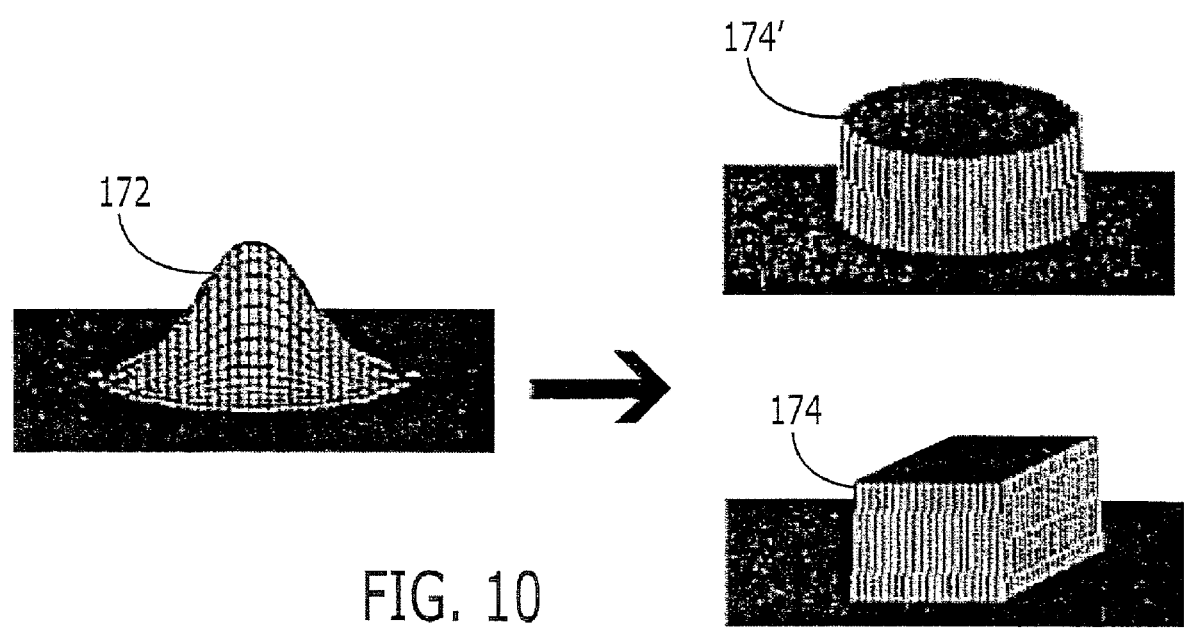
FIG. 10 illustrates operations that may be performed to create a top hat profile from a Gaussian profile of a laser beam according to some embodiments of the present invention.

In particular, referring to FIG. 10, far field patterns of a laser beam often feature an intensity peak at the center, while a more uniform intensity may be desired in numerous applications. Thus, flattening or other reshaping of the near-Gaussian laser beam profiles 172 into the top hat profile 174 (a relatively uniform distribution of intensity over a given spot area) may be desired. Diffractive optics technology makes it possible to produce near-Gaussian 172 to top hat 174 transformation by a single beam shaping element 170 with only reduced or minimal power loss. This element 170 can provide a uniform spot distribution of specific size and shape at a specific distance. In principle, any transverse spot shape can be obtained, although some embodiments may use round 174', rectangular 174 (including square) and/or hexagonal spot shapes. The design of the diffractive element 170 can be optimized for a given input beam. By adding a lens to the diffractive element, it is possible to shift the location and/or to change the scale of the top hat distribution, thus tailoring it to a specific application. The design and manufacture of a diffractive optical element 170 that converts the circular Gaussian profile 172 of the pulsed laser beam that emerges from the vacuum spatial filter 160 to a rectangular top hat profile 174 of relatively uniform intensity is well known to those having skill in the art and need not be described further herein. In other embodiments, other optical elements, such as refractive optical elements may be used.

The overfilling or the under filling of the diffractive optical element 170 may result in extra intensities at the edges and/or a more rounded shape of the beam. The exact location of the second one-meter lens 168 may allow the desired filling of the diffractive optical element 170. The diffractive optical element 170 may be designed to create a top hat profile 174 of the beam from the Gaussian profile 172. Non-Gaussian intensities in the incident beam that is set incident on the diffractive optical element 170 may result in anomalous light distributions and may result in the formation of a less effective beam for the application of creating apertures 198. These non-uniformities may slightly impact and distort the shape of the apertures 198. The beam may be less effective in creating a uniform exposure, which may be desirable for the commercial application of this process to produce commercial products. The top hat assembly 170 may be designed to create a square beam and can also expand from the incident beam forward. The remaining optional one-meter lens 820 may be used to further collimate the beam and to make a parallel beam profile of the diverging beam that exits the diffractive optical element 170.

The beam may then be set incident on an optional beam sampler assembly 830. This can cause a few percent of the beam intensity to be reflected back at an angle to the beam caused by a first surface bounce, as shown by 832. The first surface is at a slight angle to the beam. The opposite surface of the sampler assembly 830 may be antireflective coated so that the beam may continue with little or no interaction. The beam shape and quality can be continuously monitored in this fashion. This monitoring can be accomplished via a camera system, typically known to display an image of the beam. Other monitoring/feedback techniques may also be used.

The laser beam is then set incident upon an optional mirror 840 and reflected back to a second mirror assembly 850 that is positioned to raster the beam across a surface of a lens sheet 190 in a first direction shown by arrow 156. Accordingly, the second mirror assembly 850 may provide an embodiment of a rasterizer. The lens sheet 190 is moved perpendicular to this rastering in a second direction shown by arrow 192, using a conventional conveyor or other substrate moving system, with the result of causing an exposure over a large surface of the material. The lens sheet 190 may be provided in a roll, which is unwound by the conveyor to move the lens sheet 190 perpendicular to the rastering, in some embodiments. Large surface exposures may be executed thereby.

It will be understood that the first mirror 840 may be used to decrease the total length of the laser beam path, and need not be used if a longer, straight line path may be used. Moreover, the rasterizer 850 may be embodied as an oscillating lens, a rotating mirror and/or lens, and/or any other conventional optical element (movable or non-movable) that may be configured to raster a laser beam. In some embodiments, the laser beam is rastered up to about 30" or more in the direction shown by arrow 156. Rastering of the beam results in a line of apertures which extends across the lens sheet 190 as the lens sheet 190 is moved in a direction shown by arrow 192, while beam rastering takes place. In some embodiments, where the lens sheet is about 40 inches tall, the beam 154 that impinges on the lens sheet is about 1¼×1¼" and the beam 154 may be rastered at a frequency of about 0.3 Hz, while the lens sheet is moved by the conveyor at a rate of about 40 inches/minute, to thereby create apertures in about 400 million microlenses (lenticular or anamorphic) having a dimension of about 50 μm×50 μm.

Figure 11:
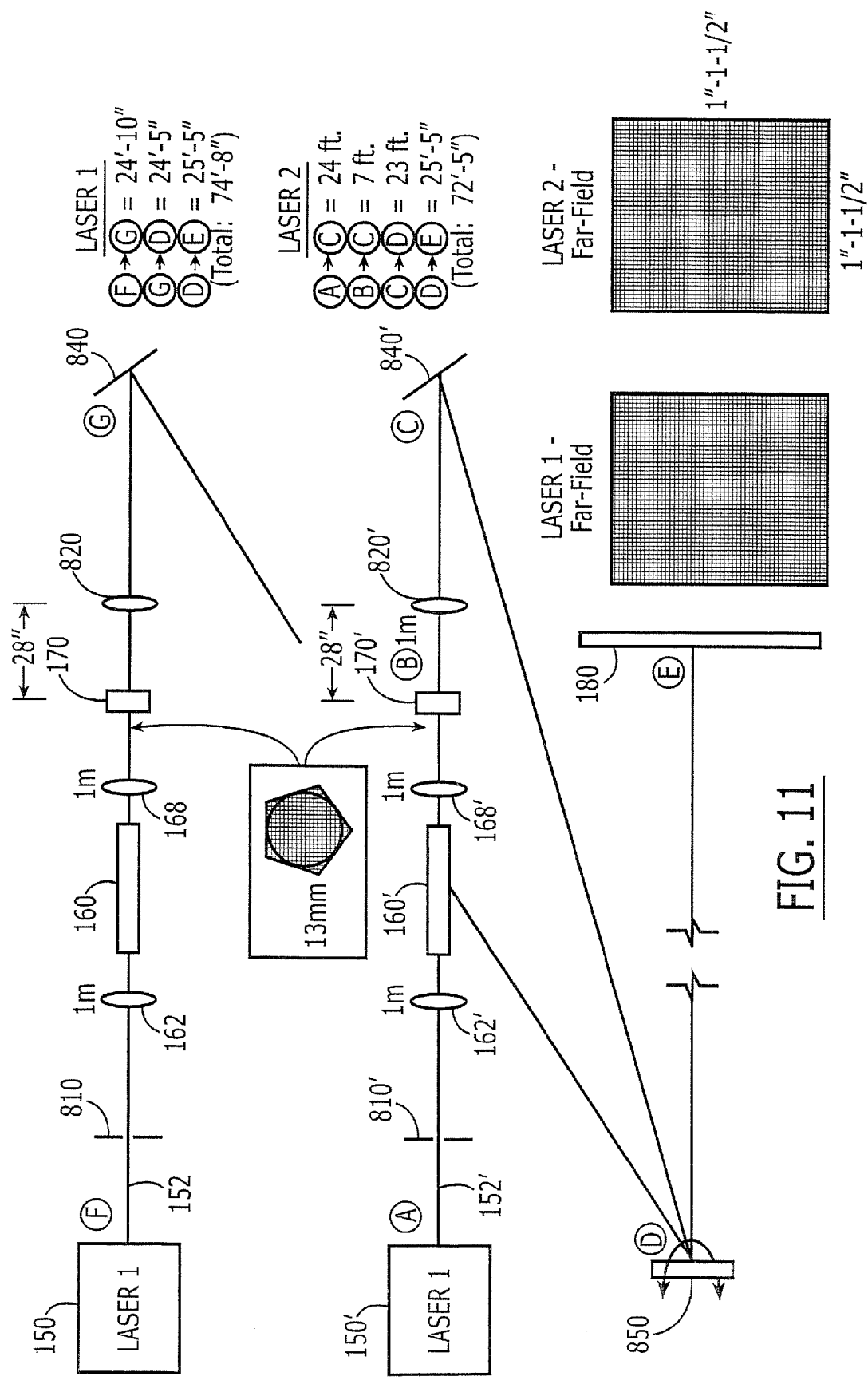
FIG. 11 illustrates apparatus and methods for creating apertures according to other embodiments of the present invention.

In still other embodiments, two or more lasers may be set up in parallel and rastered slightly offset from one another, to obtain higher throughput, at the potential complexity of maintaining alignment between the two lasers as they are rastered. FIG. 11 illustrates some embodiments of the present invention where two lasers are used. Relative distances and beam intensities, profiles and diameters are also shown. In FIG. 11, identical components of the second laser system are indicated by a prime (') notation. Total lengths are also shown. Moreover, the beam profile and diameter is shown prior to entering a holographic element 170/170', and at the diffuser element 180.

Other aspects of impinging the pulsed laser beam 152 having a top hat profile 174 onto the layer 196 through the microlens array 194, and the diffusing of the top hat profile beam by a diffuser 180, according to other embodiments of the invention, now will be described. The spatial filter function provided by the creation of an aperture 198 following the microlens element 194 provides a way to at least partially remove random fluctuations from an intensity profile of light created by the microlenses 194. The microlenses 194 can provide an efficient method of moving light from one side 192a to the other side 192b of the sheet or substrate 192 and through the opaque or nearly opaque material 196 which may be black, reflective and/or other light functional material. The apertures 198 can enable a majority of light, for example possibly 99% or more, to pass, and block noise about the apertures 198. In the case where the opaque material 196 is a reflector, it may also play a part in functionality of helping to recycle or reprocess the light.

In applications where a conventional black material, also simply referred to herein as "black," is used, the black layer may become the only source of black color for visible applications. In particular, to create black pixels on rear projection, plasma, liquid crystal displays, and other related applications, the display generating technology may not create black in the image. Rather, black in an image may be created by the use of some type of black matrix, usually deployed in the light path. When the light is extinguished from a pixel, the black matrix is observed. If no black matrix material is used then a viewer might see grey or metallic colors that are used in the display generating technology and are also reflective. The contrast may be reduced or minimal and the reflection of ambient light may cause the washout of images created on the surface by the image engine.

Accordingly, it may be desirable to provide a black matrix that can efficiently transmit light through the black matrix and allow a relatively large amount of black to be present, to provide an ambient light rejection layer to aid in the formation of contrast. In general, the larger the amount of black on the surface, the greater may be the ability to reject ambient light, image washout and the greater may be the contrast. Stated differently, contrast may be infinite in a dark room, but without the black, there may be little contrast in a room with lights. Therefore, the black material can help provide a desired contrast. Similarly, where the film is reflective or a combination of reflective and antireflective, these films can provide functionality by interaction with the transmitted light and/or for other electronic or dielectric applications.

Accordingly, it may be desirable to provide apertures having (1) a desired shape, which can impact the ability to provide desired spatial filter functionality; (2) a desired size relative to the shape and character of the focus or the application and use of the film; and/or (3) a desired density of apertures about each lens. Desired shape, size, character and number of apertures per lens may be provided, according to some embodiments of the invention, as will now be described.

Multiple apertures 198 per lens 194 may be created by virtue of exposing the film with the incident laser light 154 directed at the surface of the lens sheet from a variety of angles. Specifically, as an example, multiple apertures per lens are seen to open when the laser is set incident to the surface at angles of 90, 75, 60 and/or 30 degrees. Small aperture strings may be formed in the film 196 opposite the lens array 194 and these may be used to allow light to be directed at angles to the surface of the lens sheet 190 and still have the ability to find a path through the sheet 190.

Figure 12:
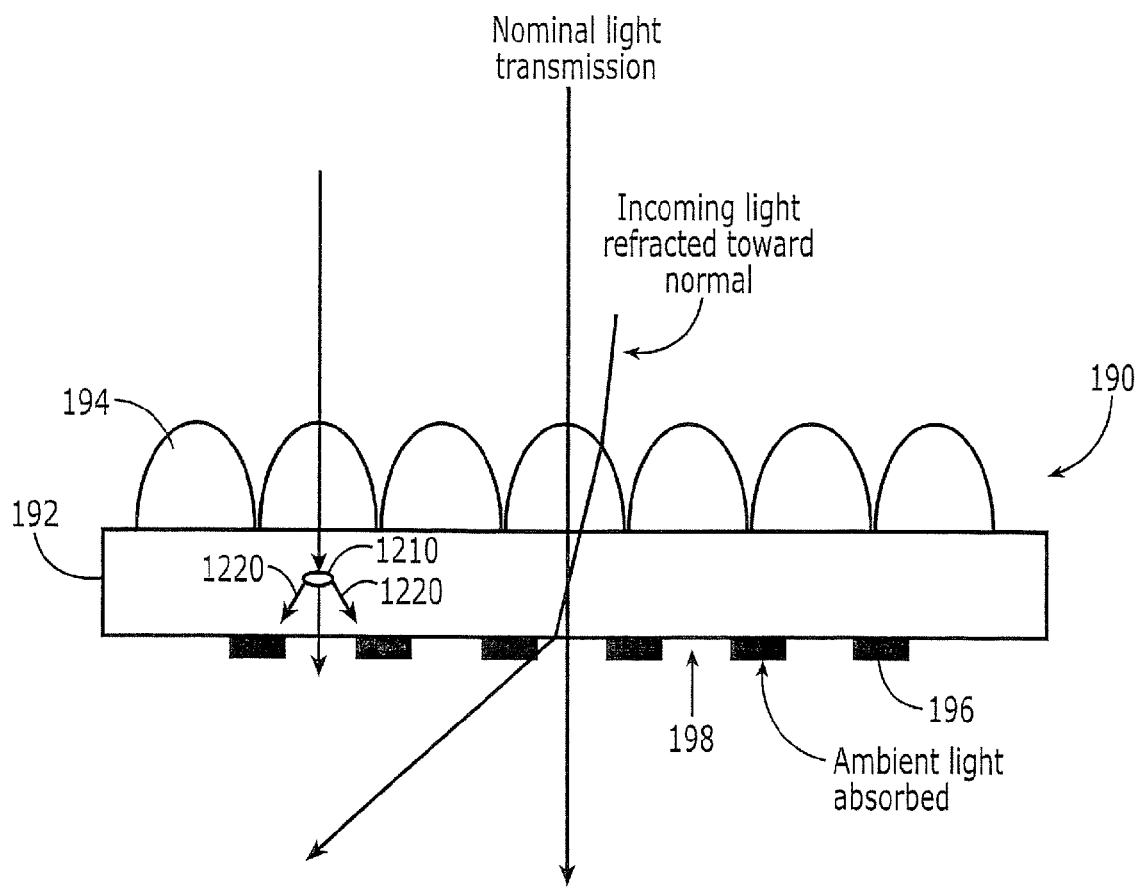
FIGS. 12 and 13 are cross-sectional views of lens sheets according to some embodiments of the present invention.

The size of the apertures 198 may be impacted by the location of the focal point of the lenses 198 past the surface of the film 196, inside the film 196 and/or inside the substrate 192. As illustrated in FIG. 12, in the case where the focal point is located inside of the substrate 192, diffuse centers 1210 can be formed by burning or particle generation within the substrate 192 when this substrate 192 is composed of plastic. These diffuse centers 1210 may comprise burned carbon, voids and/or related particulate that causes light to be refracted, diffracted and/or reflected from its path through the film 192. Small particles have been observed as causing the diffraction of shorter wavelengths of light. Diffracted light may by directed in multiple directions, as shown by arrows 1220, and may fail to progress through the apertures 198 and be directed at a black area 196, which may result in a decrease in transmission and a decrease in the efficiency of the construction.

Thus, these diffuse centers 1210 can cause a reduction in the transmission efficiency of the lens sheet 190 by redirecting light to non-aperture areas in the sheet and are not usually desirable. Thus, these diffuse centers 1210 can act as scattering centers and their effect may be a function of the granularity of these centers 1210 and their size.

In the case where the lens focal length is longer than the thickness of the lens sheet 190, the aperture formation may be related to the size of the beam 154 or the diameter of each beam created by the lenses 194, at the surface of the opaque or nearly opaque material 196. Where the focal length created by the lens 194 is much longer, the apertures 198 may be larger. Where visible light is the general application, it may be desirable to provide that all of the light on one side of the sheet is transmitted to the opposite side via the efficiency implemented by the lens 194. Some embodiments of the invention use longer wavelengths of laser light 152 to create the aperture 198.

As an example, the focal length of a typical lens will be shorter with ultraviolet (UV) wavelengths than when near infrared (IR) wavelengths are used. This may be typically observed as an error of chromatic aberration of a lens. More simply stated, a lens will generally have different focal lengths at different wavelengths. Thus, a white light image can be focused by a lens and get a sharp image in any color, but that image may be blurred by the out of focus images of other colors, outside the visible. This difference in the focal length for short wavelengths versus long wavelengths can be of the order of several percent of the total focal length. This error can be larger for less perfect lenses. This difference in focal lengths may be referred to as a longitudinal chromatic aberration.

If the lens sheet 190 is formed of lenses 194 having large errors in the longitudinal chromatic aberrations, then use of longer wavelength lasers to execute aperture formation may result in slightly larger apertures and ensure that the shorter wavelengths or colors, have an aperture large enough to transmit their wavelength. Accordingly, some embodiments of the invention can use an infrared laser 150 that emits a wavelength of, for example, 1064 nm. In contrast, UV sensitive resin materials may be used with UV lasers to fabricate self-aligned apertures via a transfer printing method, as described in U.S. Pat. No. 6,970,288 to Ebina et al. These shorter wavelengths may create slightly smaller apertures and might cut or block some of the visible light from transmission through the aperture. Moreover, as described in U.S. Pat. No. 6,700,702 to Sales entitled "*High-Contrast Screen With Random Microlens Array*," UV illumination is also used to create apertures. Again, this UV radiation may result in slightly smaller apertures that might cut or block some of the visible light from transmission.

In other embodiments, even the apertures from a 1064 nm laser might not create large enough apertures for some applications. In particular, the aperture creation process may be considered a "threshold" process whereby an aperture 198 is fully created or the area to be removed may be cracked and then not amenable to being blown off. The materials of the layer 196 may be designed such that the removal of material occurs similar to the function of a piston. When hit with sufficient power density, the piston or aperture 198 will fully open. If the material is hit by slightly less than sufficient power density, then the piston will crack, allow pressure to escape and the aperture 198 will not fully open. When illuminated again with a higher power, the cracked area may not enable full aperture opening and the opening of the aperture will no longer be a clean and predicable process.

The power of the laser incident upon the surface can be modulated to some extent by modifying the beam diameter via conventional techniques (such as expander optics), thereby modifying the power per unit area that is applied to the surface. However, the actual aperture size may not be altered much by changing the power density, except in the case where significantly greater power is applied by focusing the beam such that the process begins to remove material from flat or non-lens area. Removal of this material may be less efficient and undesirable. Conversely, if the beam spot is made large, less than sufficient power per unit area may result and the aperture area may become damaged or the film material may crack, thus at least partially defeating the piston action that creates an efficient and controllable aperture formation. The beam spot may also become so large as to lower the power density such that no effect of exposure occurs.

The simmer or lamp saturation power of the laser 150 also can be altered to modify slightly the power output of the laser, but that may not be desirable since this is rarely controllable because it appears as a non-linear (e.g., logarithmic) effect. That is to say, a small change in the light saturation current can have a very large effect on the output power of the laser 150.

Figure 13:
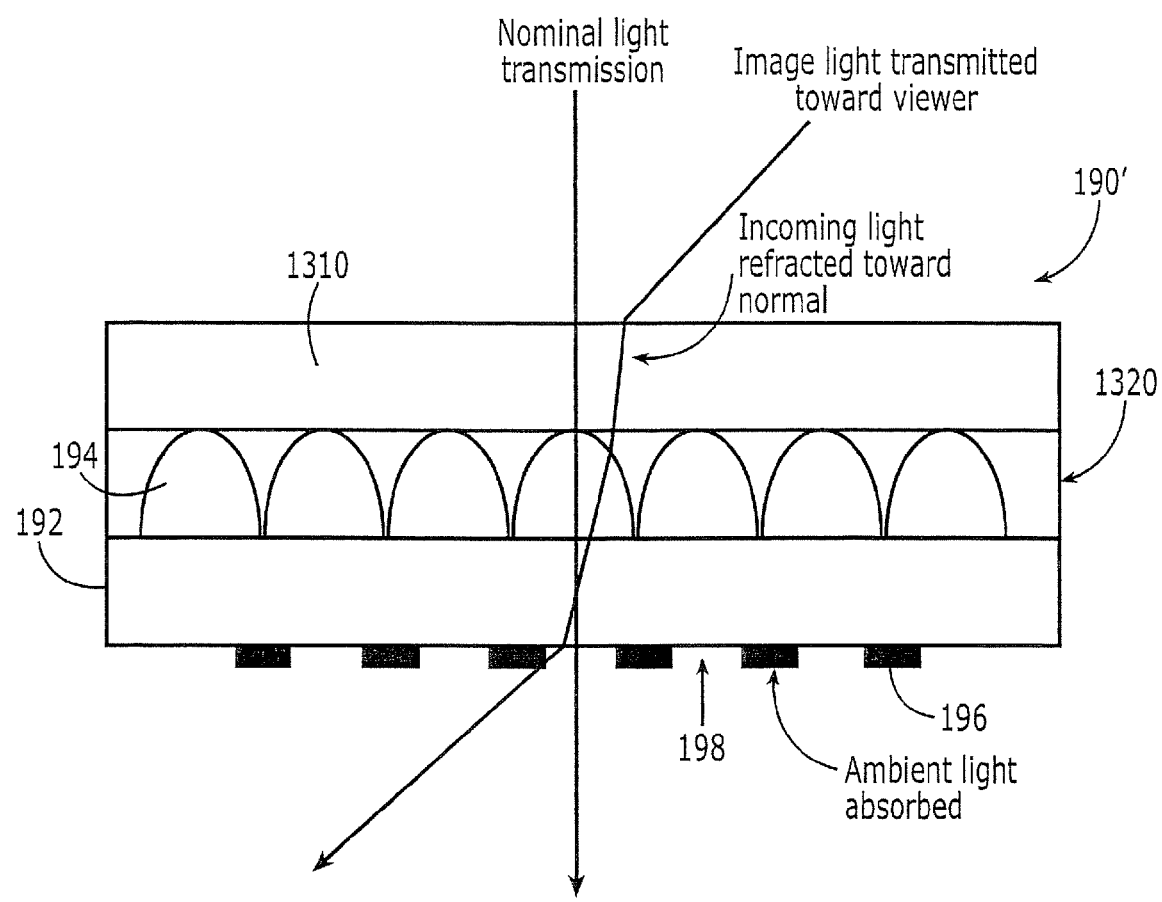

It has been found, according to other embodiments of the invention, that larger apertures 198 may be created in a well-controlled fashion by deploying over the lens sheet 194 a film having a different index of refraction, such as a low index layer or film. This low index film can effectively lengthen the focal length of the lens 194, which can cause a significant broadening of the apertures 198 that are created. FIG. 13 illustrates the use of a low index film 1310, such as a polyester film, on the microlens array 194, remote from the substrate 192. As used herein, low index means having a lower index of refraction than the microlens array 194. A coupling layer 1320 that may comprise water or silicone cement, may be sandwiched between the lenses 194 and the low index film 1310. The index of refraction of the coupling layer 1320 may be same as, less than or greater than that of the microlenses 194 or the low index layer 1310. In other embodiments, a higher index film may be used.

In some embodiments of the invention, the lens sheet 190 may be covered with a coupling film 1320 of water which is sealed between the lens sheet 194 and a polyester film 1320 just prior to the exposure process. Alternatively, the coupling film 1320 may comprise a film of silicone-based cement, which is placed over the surface of the lens sheet 190'. In both cases the initial aperture openings (prior to cladding with a lower index material 1310) were of the order of about 16% to about 20%. After applying a cladding of water or silicone cement 1310 to the lenses 194, the apertures 198 were opened up to about 50% for the water and about 40% for the silicon cement. The large increase in the aperture size appears to be a result of increasing the focal length by a factor of 2 to 5 times the original focal length of the lens 194. In some embodiments, the refractive index of water 1320 is of the range of 1.3 and the refractive index of the silicon-based cement is of the range of 1.4. The lens material has a refractive index of about 1.5.

According to other embodiments of the invention, the size and/or character of the apertures 198 that are formed during laser impingement 154 may be controlled by adding a diffusing optical element 180 in the path, just prior to the laser beam 154 striking the surface of the lens sheet 190. This diffusing optical element 180 can disrupt the uniform coherence of the beam 154 just prior to the mega watts of optical power being incident on the lens sheet 190. Each part of the diffusive material can effectively cause the initiation of a multitude of micro beams and can, thus, disrupt the uniformity of the main laser beam sufficiently to open the aperture in a controlled fashion.

The use of a diffusive element 180 that at least partially destroys the coherency of the laser beam 150 appears to be contrary to conventional wisdom. In particular, it would not be considered conventional to spend the money and time to create a coherent beam of light, make it uniform, and then at least partially destroy the coherency. However, some embodiments of the present invention have found that it may be advantageous to do exactly that.

Figure 14:
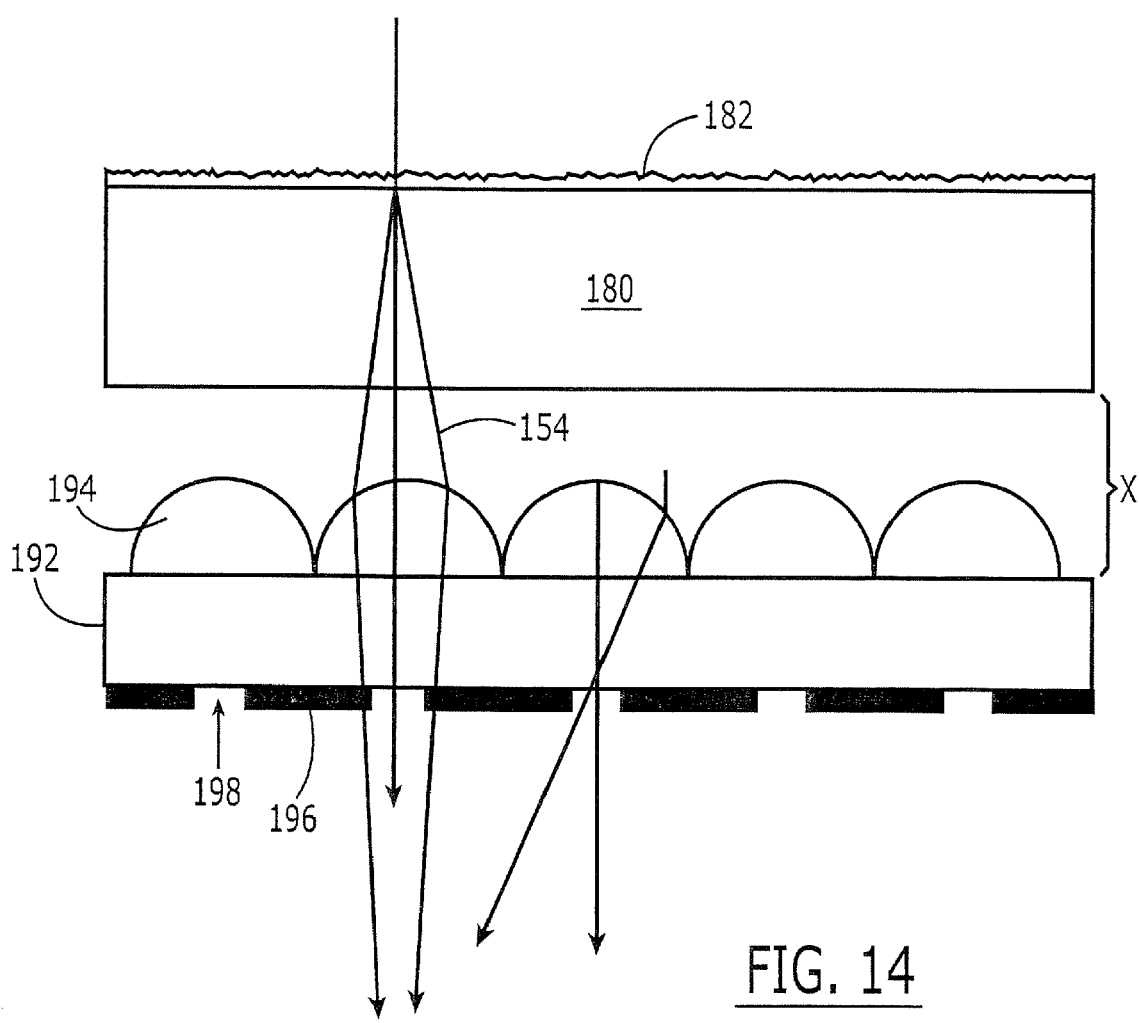
FIG. 14 is a cross-sectional view of a lens sheet and a diffuser according to some embodiments of the present invention.

In some embodiments, the laser beam that has been diffused 154 can become mostly amorphous in character with no apparent variation in intensity in its profile. The apertures 198 created thereby can be controlled in size to be slightly greater than would be created by a fully coherent beam to provide more extensive removal of the opaque material. The degree of material removal can thereby be controlled. Accordingly, the degree to which the aperture over sizing is accomplished may be controlled. Thus, each pinhole or aperture 198 can be tuned to be just slightly larger than the minimum hole formation size or it can be made to be much larger than a minimum hole formation size. FIG. 14 illustrates an element of the lens sheet 190 and the diffusive element 180.

A series of diffusers 180 of increasing diffusive character were deployed to investigate their potential impact on the aperture creation process. The diffusers 180 were characterized by the resulting size of a halo or beam diameter that a small red laser would form upon passing through the material. Diffusers of the type that would cause divergence of 1, 2, 4, 6, 8 and 10 degrees of the projected image of the beam on a card, at a short distance from the diffusive sheet, were investigated. The larger the amount of diffuse character that the diffuser displayed, i.e., 10 degrees vs. 1 degree, would also impact the resulting energy that was eventually incident on the surface of the lens array. The dissipation of too much energy may not yield an efficient aperture formation process.

The diffusive character of the example surface diffusers may be further enhanced by the index of refraction of the substrate 180, such as plastic, that supported the diffuser layer 182. Polycarbonate with a higher index of refraction may be more effective than polyester in causing a uniform divergence of the beam with limited loss in power. The same diffusive character 182 supported on polycarbonate resulted in a smoother delivery than on polyester sheet. This diffusive character was presumably reinforced by the index of refraction of the polycarbonate, as thicker polycarbonate was better than thin polycarbonate. The diffusive element can also be embodied by glass of various diffusive characters as well. The refractive index of polycarbonate (1.58) is slightly higher than glass (1.52), which is slightly higher than PMMA (1.49). In some embodiments, the effect of the diffuser was most emphasized by the higher index of refraction materials.

As noted above, the shape of the aperture may be generally dictated by the lens or lens shape. Lenses that form a sharp focal point may create sharp apertures. Lenses, such as lenticular lenses that form long lines of focal length, may create apertures that are long in length. Lens sheets 190 that are composed of lens that have both long and shorter focal lengths may create apertures that are small and large relative to the lens involved.

EXAMPLES

The following Examples shall be regarded as merely illustrative and shall not be construed as limiting the invention.

A laser 150 was configured as in FIG. 8. The top hat profile laser beam is directed to a mirror 840, and is reflected and traverses a distance of about 2 to about 50 feet. The beam then strikes a second mirror 850, which is mounted perpendicular to a rotary table. The rotary table oscillates between angles of +/−1 to about +/−5 degrees to cause the beam 154 to scan over the surface to be exposed, which is positioned opposite this last oscillator mirror 850. Positioned between the last oscillating mirror 850 and the lens sheet 190 to be exposed is the diffuser element 180. As mentioned before, the amount of diffusive character of the element may have an impact on aperture creating.

Diffusive optical elements 180 can be acquired or created by known techniques. In this example, a glass sheet 180 was subject to a glass bead spray at 80 lb. pressure and the spray was directed over the surface to create a uniform diffusive glass surface 182. Other examples were made of diffusive glass in the same fashion by spraying the surface under pressures ranging from about 10-about 100 lb. pressure, but the diffusive glass that results from the 80 lb. pressure spray was used for this Example. Making the diffusive glass by this technique is well known in the art to create diffuse and artistic glass.

In yet other embodiments of the invention, substrates having a diffusive interior may be used instead of, or in addition to, diffusive surfaces. These so called volume diffusers may be embodied using volume diffusive boards that are used in projection TVs and that can be supplied with a diffusive content of, for example, 30, 40, 50, 60, 70 and 80% from various manufacturers. The diffusive material in the extruded board may be silicon oxide, aluminum oxide and/or various other colloidal particles of plastic.

In addition, the distance X between the lens sheet 190 and the diffuser 180 of FIG. 14 may impact the final laser energy 154 that is applied. The lens sheet 190 is translated perpendicular to the rastering laser beam and thus a large lens sheet can be exposed to the laser beam. In this way a large array of lens with self-aligned apertures can be created.

Figure 15:
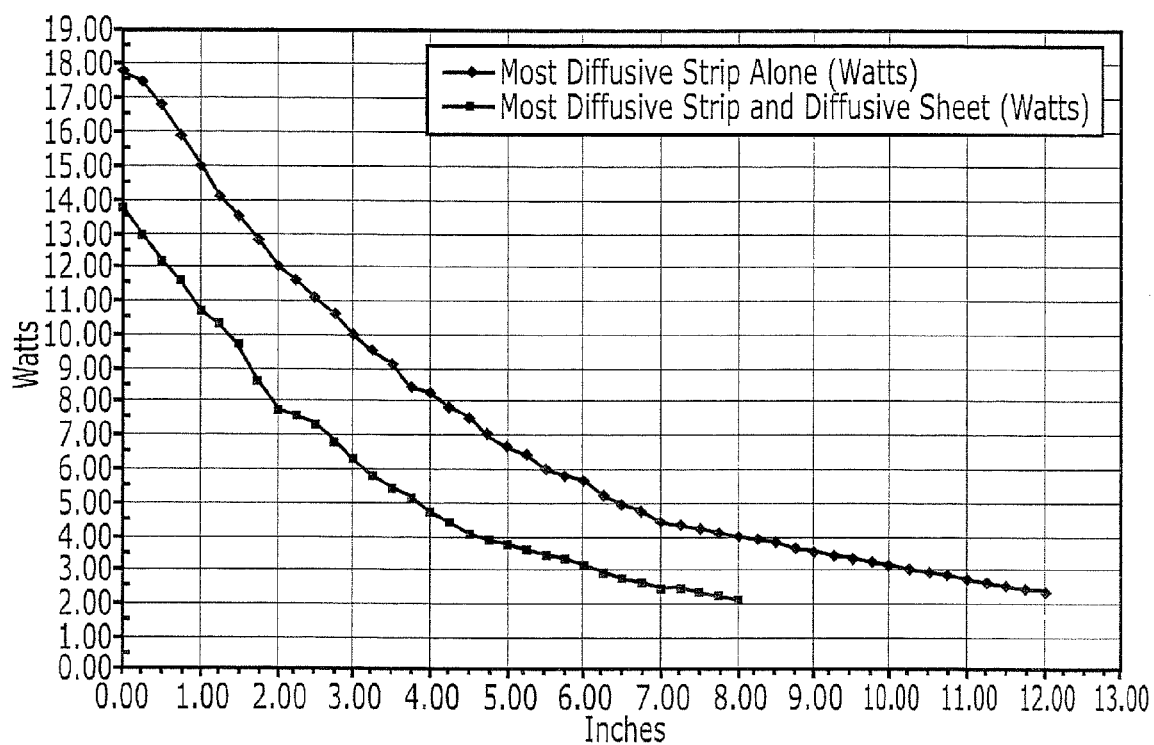
FIG. 15 graphically illustrates an example of laser beam energy of a laser beam that emerges from a diffuser according to some embodiments of the present invention.

FIG. 15 graphically illustrates an example of the beam energy 154 applied at some distance from the diffusive sheet 180. In FIG. 15, a power meter was placed at various distances in inches from the back of a diffusive sheet 180 and also where two diffusive sheets were overlaid.

Light, with an energy of about 8 watts in a 10 mm round spot was set incident on the lens sheet with a 4 micron layer of carbon black film that was created as a coating with a polymer binder to hold the coating on the surface of a 2 mil polyester sheet. About 20% black was removed and the remaining material is opaque.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of optically processing a pulsed laser beam to create apertures in a layer on a back side of a substrate that includes a microlens array on a front side thereof, the method comprising:

impinging the pulsed laser beam through the microlens array on the front side of the substrate and onto the layer on the back side of the substrate, wherein the substrate that includes the microlens array on the front side thereof and the layer on the back side thereof is configured for visible light applications and wherein the pulsed laser beam is a pulsed laser beam having longer wavelength than visible light, and wherein the pulsed laser beam is at least one inch square in area where the pulsed laser beam impinges on the substrate and is sufficiently uniform in power to create apertures in the layer on the back side of the substrate through all of the microlenses in the microlens array on the front side thereof on which the at least one inch square pulsed laser beam impinges, wherein the microlenses include at least one base dimension that is less than about 100 μm in size.

2. A method according to claim 1 wherein impinging the pulsed laser beam comprises moving the substrate that includes the microlens array on the front side thereof and the layer on the back side thereof in a given direction while rastering the pulsed laser beam across the substrate perpendicular to the given direction to create the apertures in the layer.

3. A method according to claim 2 wherein moving the substrate that includes the microlens array on the front side thereof and the layer on the back side thereof in a given direction while rastering the pulsed laser beam across the substrate perpendicular to the given direction to create the apertures in the layer is performed so as to overlap impingement areas of the pulsed laser beam on the substrate in both the given direction and perpendicular to the given direction.

4. A method according to claim 1 wherein the pulsed laser beam is sufficiently uniform in power to create apertures in the layer on the back side of the substrate through the microlenses in the microlens array on the front side thereof on which the at least one inch square pulsed laser beam impinges, without visible defects, wherein the microlenses include at least one base dimension that is less than about 100 μm in size.

5. A method according to claim 1 wherein the pulsed laser beam is sufficiently uniform in power to create apertures in the layer on the back side of the substrate through the microlenses in the microlens array on the front side thereof on which the at least one inch square pulsed laser beam impinges, with non-visible defects that have a periodicity of at least about one inch, wherein the microlenses include at least one base dimension that is less than about 100 μm in size.

6. A method according to claim 1 wherein the pulsed laser beam is a pulsed infrared laser beam.

7. A method according to claim 1 wherein at least some of the apertures include debris from the layer in the centers thereof.

8. An apparatus that is configured to perform the method of claim 1.

9. A method of optically processing a pulsed laser beam to create apertures in a layer on a back side of a substrate that includes a microlens array on a front side thereof, the method comprising:

impinging the pulsed laser beam through the microlens array on the front side of the substrate and onto the layer on the back side of the substrate, wherein the pulsed laser beam is at least one inch square in area where the pulsed laser beam impinges on the substrate and is sufficiently uniform in power to create apertures in the layer on the back side of the substrate through all of the microlenses in the microlens array on the front side thereof on which the at least one inch square pulsed laser beam impinges, wherein the microlenses include at least one base dimension that is less than about 100 μm in size.

10. A method according to claim 9 wherein impinging the pulsed laser beam comprises moving the substrate that includes the microlens array on the front side thereof and the layer on the back side thereof in a given direction while rastering the pulsed laser beam across the substrate perpendicular to the given direction to create the apertures in the layer.

11. A method according to claim 9 wherein the pulsed laser beam is sufficiently uniform in power to create the apertures in the layer on the back side of the substrate, with non-visible defects that have a periodicity of at least about one inch.

12. A method according to claim 9 wherein at least some of the apertures include debris from the layer in the centers thereof.

13. An apparatus that is configured to perform the method of claim 9.

14. A method of optically processing a pulsed laser beam to create apertures in a layer on a back side of a substrate that includes a microlens array on a front side thereof, the method comprising:

impinging the pulsed laser beam through the microlens array on the front side of the substrate and onto the layer on the back side of the substrate, so as to create a given aperture through a given microlens of the microlens array using a single pulse of the pulsed laser beam, wherein the pulsed laser beam is at least one inch square in area where the pulsed laser beam impinges on the substrate and is sufficiently uniform in power to create apertures in the layer on the back side of the substrate through all of the microlenses in the microlens array on the front side thereof on which the at least one inch square pulsed laser beam impinges, wherein the microlenses include at least one base dimension that is less than about 100 μm in size.

15. A method according to claim 14 wherein impinging the pulsed laser beam comprises moving the substrate that includes the microlens array on the front side thereof and the layer on the back side thereof in a given direction while rastering the pulsed laser beam across the substrate perpendicular to the given direction to create the apertures in the layer.

16. A method according to claim 14 wherein moving the substrate that includes the microlens array on the front side thereof and the layer on the back side thereof in a given direction while rastering the pulsed laser beam across the substrate perpendicular to the given direction to create the apertures in the layer is performed so as to overlap impingement areas of the pulsed laser beam on the substrate in both the given direction and perpendicular to the given direction.

17. A method according to claim 14 wherein at least some of the apertures include debris from the layer in the centers thereof.

18. An apparatus that is configured to perform the method of claim 14.

* * * * *